US012754322B2

(12) United States Patent
Xu et al.

(10) Patent No.: US 12,754,322 B2
(45) Date of Patent: Oct. 6, 2026

(54) PRECISION PREDICTION OF TIME-OF-FLIGHT SENSOR MEASUREMENTS

(71) Applicant: GM Cruise Holdings LLC, San Francisco, CA (US)

(72) Inventors: Zhanping Xu, Sunnyvale, CA (US); Kartheek Chandu, Dublin, CA (US); Glenn D. Sweeney, Sebastopol, CA (US); Brandon S. Seilhan, San Ramon, CA (US); Robert Vets, Seattle, WA (US); Mateusz Monterial, Livermore, CA (US); Paul Carrington Foster, Mountain View, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 809 days.

(21) Appl. No.: 18/189,720

(22) Filed: Mar. 24, 2023

(65) Prior Publication Data

US 2024/0319375 A1 Sep. 26, 2024

(51) Int. Cl.
*G01S 17/894* (2020.01)
*G06T 7/20* (2017.01)
*G06T 7/50* (2017.01)

(52) U.S. Cl.
CPC .............. *G01S 17/894* (2020.01); *G06T 7/20* (2013.01); *G06T 7/50* (2017.01)

(58) Field of Classification Search
None
See application file for complete search history.

(56) References Cited

U.S. PATENT DOCUMENTS 8,737,769 B2 * 5/2014 Finch ........................ G06T 7/50 382/300
11,688,073 B2 * 6/2023 Peri ........................... G06T 7/13 345/419
2019/0058859 A1 * 2/2019 Price .................... H04N 13/271

* cited by examiner

*Primary Examiner* — Marisa V Conlon
(74) *Attorney, Agent, or Firm* — CANTOR COLBURN LLP

(57) ABSTRACT

Systems and techniques are provided for predicting precision of time-of-flight (TOF) sensor measurements. An example process includes receiving depth data associated with a frame, the depth data being captured by a TOF camera by illuminating a modulated signal of the TOF camera and receiving a reflected signal at the TOF camera, wherein the depth data comprises a plurality of correlation samples based on the reflected signal; receiving, from the TOF camera, grayscale image data corresponding to the frame; determining a modulation amplitude of the modulated signal based on the plurality of correlation samples; determining one or more parameters associated with at least one of the depth data and the grayscale image data; and determining a reliability of the depth data based on the modulation amplitude of the modulated signal, the grayscale image data, and the one or more parameters.

20 Claims, 8 Drawing Sheets

PRECISION PREDICTION OF TIME-OF-FLIGHT SENSOR MEASUREMENTS

BACKGROUND

1. Technical Field

The present disclosure generally relates to time-of-flight (TOF) sensors. For example, aspects of the present disclosure relate to techniques and systems for predicting a precision of TOF sensor measurements based on sensor data associated with a single frame.

2. Introduction

Image sensors are commonly integrated into a wide array of systems and electronic devices such as, for example, camera systems, mobile phones, autonomous systems (e.g., unmanned aerial vehicles or drones, autonomous vehicles, robots, etc.), computers, smart wearables, and many other devices. The image sensors allow users to capture frames (e.g., video frames and/or still pictures/images) from any electronic device equipped with an image sensor. For example, an image sensor converts light into electrical signals that can be processed and used to create images. As such, a frame is generated by capturing and processing the electrical signals that are generated when light falls on the sensor's pixels. The quality of a frame can depend on the capabilities of the image sensor used to capture the frame and a variety of factors such as, for example, exposure, resolution, framerate, dynamic range, etc.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
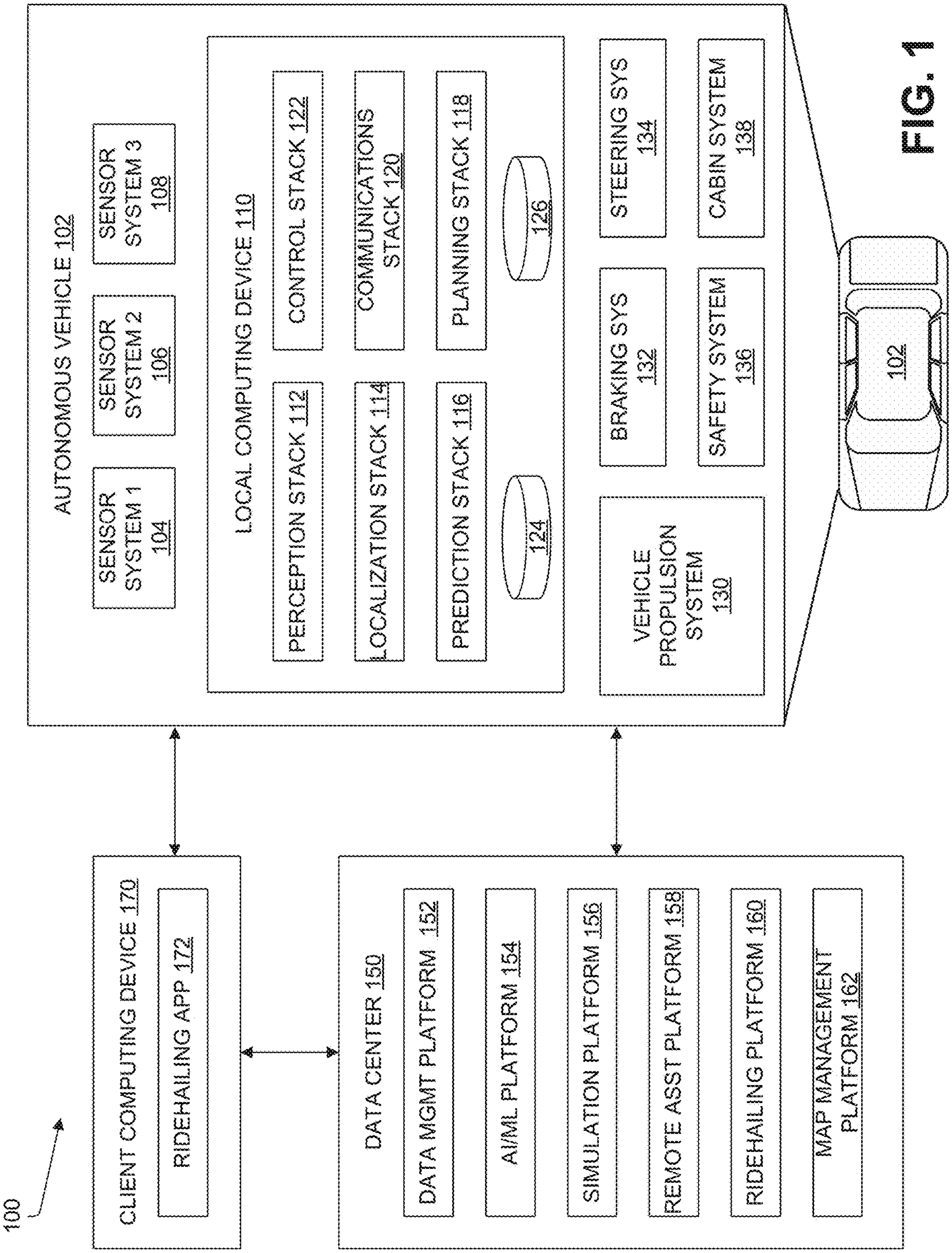
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

An autonomous vehicle (AV) is a motorized vehicle that can navigate without a human driver. An exemplary AV can include various image sensors, such as a camera sensor, a light detection and ranging (LiDAR) sensor, a radio detection and ranging (RADAR) sensor, a time-of-flight (TOF) sensor, an ultrasonic sensor, amongst others. The image sensors can provide the data and measurements to an internal computing system of the AV, which can use the data and measurements to create a comprehensive view of the environment around the AV and control a mechanical system of the AV such as a vehicle propulsion system, a braking system, or a steering system.

A TOF sensor (also referred to as a TOF camera sensor or TOF camera) is a range imaging camera sensor system that measures the time it takes for a signal (e.g., a light pulse or electromagnetic continuous wave (CW)) to travel from the sensor to an object and back again. By measuring the time of flight of the signal, the TOF sensor can determine the distance between the sensor and the object, which allows the sensor to create a three-dimensional (3D) image of the scene or object being measured. As such, frames captured by TOF sensors can be used to estimate depth information of targets in a scene. For example, an internal computing system of an AV can use a TOF sensor to measure a distance of each pixel in a frame captured by the TOF sensor relative to the TOF sensor. The distance information can be used to obtain a representation of the spatial structure, distance, and/or geometry of a scene and/or a target in the scene.

Generally, a signal strength (e.g., high or low intensity) can be an indicator of a reliability or precision of a signal. For example, a stronger signal can lead to more precise TOF measurements. Also, a higher signal-to-ratio (SNR) can result in more precise measurements since there is less noise that can interfere with the signal, leading to more accurate distance measurements. As such, a shot noise from ambient light (e.g., natural ambient sunlight or artificial ambient light such as a nearby streetlight, lamp, or similar) can affect a signal-to-noise ratio and reliability or precision of TOF measurements. For example, when the intensity of the ambient light is higher, noise(s) generated from ambient light can be higher and degrades the precision of the signal measurement.

One example technique to determine a precision or reliability of TOF measurements is based on the statistics of multiple frames of measurements. For example, several 100 frames captured by a TOF sensor can be evaluated to determine a standard deviation and precision of TOF measurements. However, gathering several frames takes time (e.g., is inefficient) and dynamic and instant values may be lost when using several frames, especially in dynamic AV applications.

Systems, apparatuses, processes (also referred to as methods), and computer-readable media (collectively referred to as "systems and techniques" or "system") are described herein for determining precision and/or reliability of TOF measurements based on data of a single frame (e.g., based on a single frame). For example, the systems and techniques described herein can provide an estimated prediction and/or reliability of TOF measurements based on data of a single frame (e.g., based on a single frame) without having to evaluate multiple frames (e.g., several 100 frames). In some examples, the systems and techniques can generate a confidence map based on the estimated precision. The confidence map can represent a range of mask values used to indicate an estimated precision of TOF measurements per pixel. In some examples, a confidence map can be used to label 3D point clouds (e.g., depth maps) with predicted precision for each TOF pixel. In some aspects, a confidence map can be used to mask and threshold one or more pixels with estimated precision (e.g., digital distribution from 0 to 1).

The systems and techniques described herein can improve an understanding of a scene by properly predicting a precision of TOF measurements based on a set of depth data and corresponding grayscale data that are associated with a single frame. The precision of TOF measurements can affect the accuracy of the distance measurements made by the TOF sensor. If the TOF sensor has low precision, it may not be able to accurately measure the time, resulting in inaccurate distance measurements. In AV applications, AVs may rely on accurate distance measurements for the safety and functionality of the system. For example, if a TOF sensor used in an AV has low precision, it may not be able to accurately detect the distance between the vehicle and an obstacle, which can lead to safety critical events (e.g., a collision or near collision, etc.). As such, the systems and techniques of the present disclosure can help an AV system (e.g., a perception stack and/or any other component of an AV system) by determining a precision and/or reliability of sensor data so that an AV can properly detect and understand the environment to navigate the environment.

Various examples of the systems and techniques described herein for determining precision of TOF measurements based on sensor data of a single frame are illustrated in FIG. 1 through FIG. 7 and described below.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 (e.g., client application) to enable passengers to view the AV 102 in transit en route to a pick-up or drop-off location, and so on.

While the AV 102, the local computing device 110, and the AV environment 100 are shown to include certain systems and components, one of ordinary skill will appreciate that the AV 102, the local computing device 110, and/or the AV environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
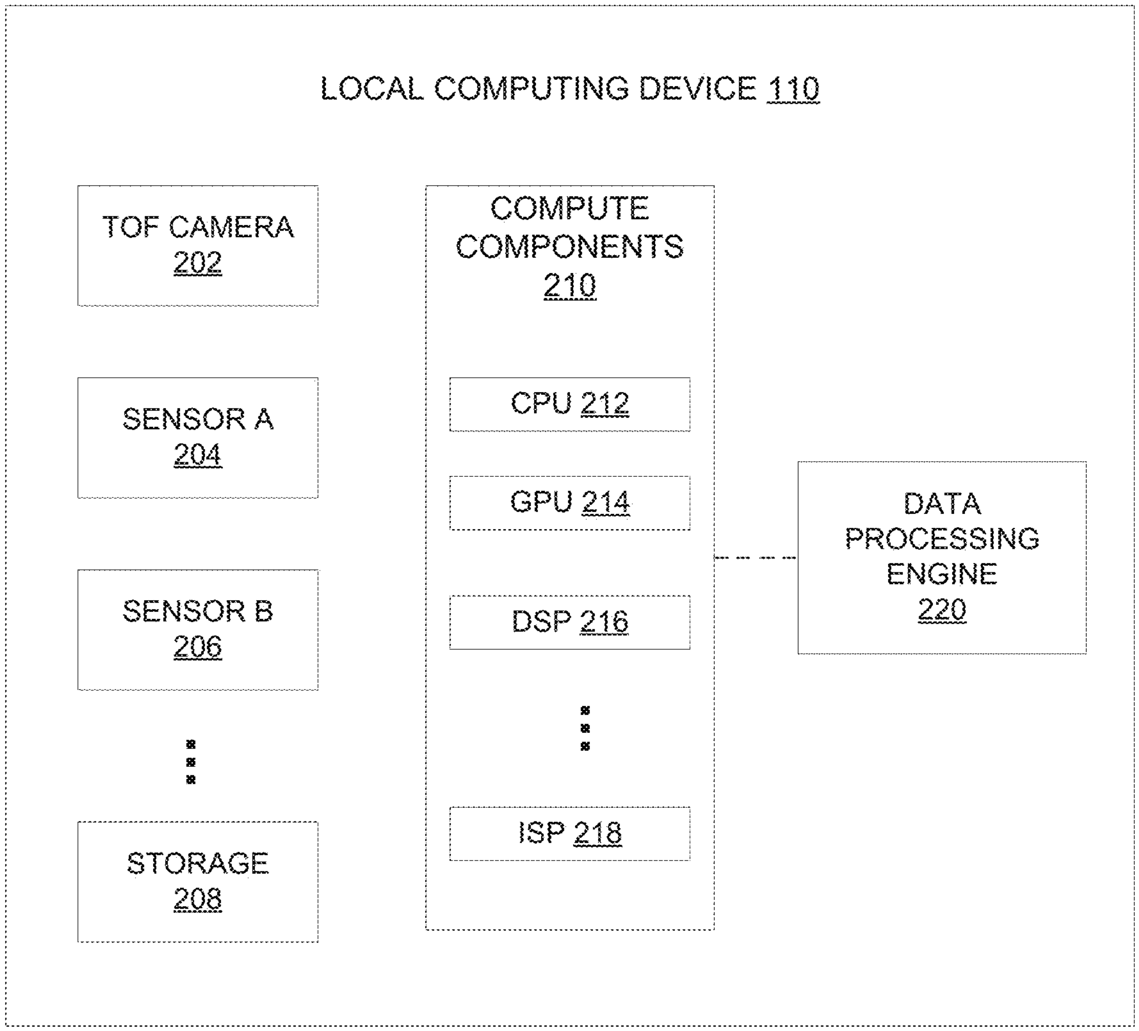
FIG. 2 illustrates a diagram illustrating an example of an electronic device used to capture sensor data, according to some examples of the present disclosure.

FIG. 2 is a diagram illustrating an example of an electronic device used to capture sensor data. In this example, the electronic device includes or represents the local computing device 110 shown in FIG. 1. However, in other examples, the electronic device can include or represent any other device used to capture and process sensor data as further described herein.

In some examples, local computing device 110 can be configured to perform 3D image signal processing. In some aspects, local computing device 110 can be configured to provide one or more functionalities such as, for example, imaging functionalities, image processing functionalities, 3D image filtering functionalities, image data segmentation functionalities, depth estimation functionalities, phase unwrapping functionalities, AV perception detection functionalities (e.g., object detection, pose detection, face detection, shape detection, scene detection, etc.), extended reality (XR) functionalities (e.g., localization/tracking, detection, classification, mapping, content rendering, etc.), device management and/or control functionalities, autonomous driving functionalities, computer vision, robotic functions, automation, and/or any other computing functionalities.

In the illustrative example shown in FIG. 2, local computing device 110 can include a TOF camera 202 (also referred to as TOF sensor) and one or more sensors such as sensor A 204 and sensor B 206 (similar to sensor systems 104-108 as illustrated in FIG. 1). In some examples, TOF camera 202 can be a 3D TOF camera system, which is configured to create a 3D image of a scene or object (e.g., 3D point cloud or depth map). Non-limiting examples of the one or more sensors can include a camera, an ultrasonic sensor, an IMU, a depth sensor using any suitable technology for determining depth (e.g., based on TOF, structured light, or other depth sensing technique or system), a touch sensor, a LiDAR sensor, a RADAR sensor, a microphone, etc.).

In some examples, TOF camera 202 and/or one or more sensors (e.g., sensor A 204 or sensor B 206) can capture image data and generate frames based on the image data and/or provide the image data or frames to one or more compute components 210 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In the illustrative example of FIG. 1, local computing device 110 can include storage 208, which comprises any storage device(s) for storing data such as, for example and without limitation, image data, posture data, scene data, user data, preferences, etc. In some examples, storage 208 can store data from any of the components of local computing device 110. For example, storage 208 can store data or measurements from any of TOF camera 202, one or more sensors (e.g., sensor A 204, sensor B 206, etc.), compute components 210 (e.g., processing parameters, outputs, video, images, segmentation maps/masks, depth maps, filtering results, confidence maps, masks, calculation results, detection results, etc.), data processing engine 220, and/or any other components. In some examples, storage 208 can include a buffer for storing data (e.g., image data, posture data, etc.) for processing by compute components 210.

In some cases, local computing device 110 can include one or more compute components 210 such as a central processing unit (CPU) 212, a graphics processing unit (GPU) 214, a digital signal processor (DSP) 216, an image signal processor (ISP) 218, etc. In some aspects, local computing device 110 can use one or more compute components 210 to perform various computing operations such as, for example, image processing functionalities, precision predictions of image data as described herein, autonomous driving operations, extended reality operations (e.g., tracking, localization, object detection, classification, pose estimation, mapping, content anchoring, content rendering, etc.), detection (e.g., face detection, object detection, scene detection, human detection, etc.), image segmentation, device control operations, image/video processing, graphics rendering, machine learning, data processing, modeling, calculations, computer vision, and/or any other operations.

In some cases, one or more compute components 210 can perform image/video processing, machine learning, depth estimation, XR processing, device management/control, detection (e.g., object detection, face detection, scene detection, human detection, etc.) and/or other operations as described herein using data from TOF camera 202, one or more sensors (e.g., sensor A 204, sensor B 206, etc.), storage 208, and/or any other sensors and/or components. In some examples, one or more compute components 210 can implement one or more software engines and/or algorithms such as, for example, data processing engine 220 or algorithm as described herein. In some cases, one or more compute components 210 can implement one or more other or additional components and/or algorithms such as a machine learning model(s), a computer vision algorithm(s), a neural network(s), and/or any other algorithm and/or component.

In some aspects, data processing engine 220 can implement one or more algorithms and/or machine learning models configured to generate depth estimates, generate depth standard deviation, perform image processing, etc., as further described herein. In some examples, data processing engine 220 can be configured to determine one or more parameters associated with noise in depth data and determine precision predictions of the depth data that is captured by TOF camera 202 and/or one or more sensors (e.g., sensor A 204 or sensor B 206).

An example architecture and example hardware components that can be implemented by local computing device 110 are further described below with respect to FIG. 7. Further, local computing device 110 can be part of, or implemented by, a single computing device or multiple computing devices. In some examples, local computing device 110 can be part of and/or include an electronic device (or devices) such as a computer system (e.g., a server, a laptop computer, a tablet computer, etc.), a camera system (e.g., a digital camera, an IP camera, a video camera, a security camera, etc.), a telephone system (e.g., a smartphone, a cellular telephone, a conferencing system, etc.), a display device, an XR device such as a head-mounted display (HMD), an IoT (Internet-of-Things) device, or any other suitable electronic device(s).

Further, the components shown in FIG. 2 with respect to local computing device 110 are illustrative examples provided for explanation purposes. In other examples, local computing device 110 can include more or less components than those shown in FIG. 2. While local computing device 110 is shown to include certain components, one of ordinary skill will appreciate that local computing device 110 can include more or fewer components than those shown in FIG. 2. For example, local computing device 110 can include, in some instances, one or more memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 2. An illustrative example of a computing device and/or hardware components that can be implemented with local computing device 110 are described below with respect to FIG. 7.

Figure 3:
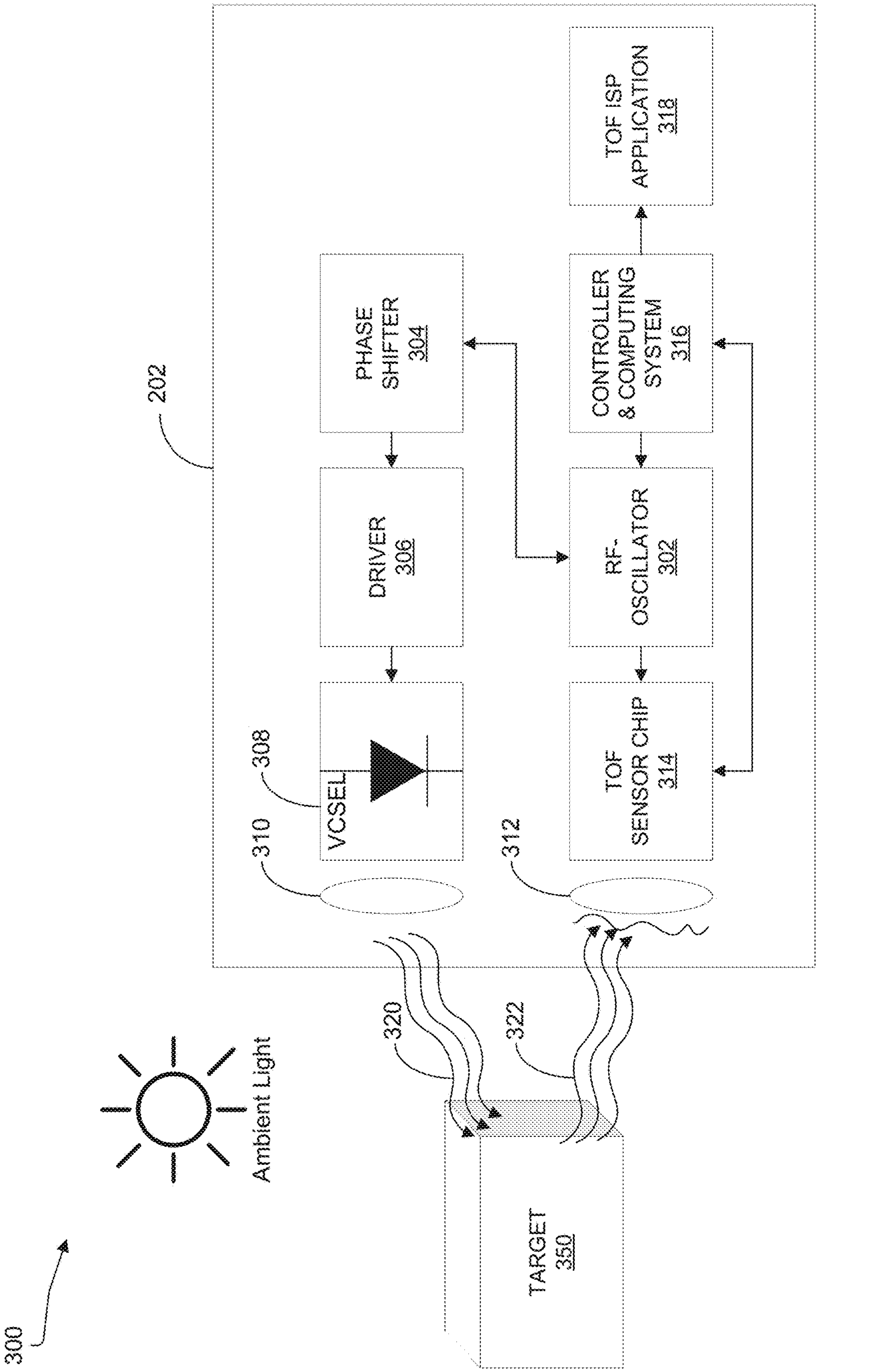
FIG. 3 illustrates an example imaging environment with a Time of Flight (TOF) camera system, according to some examples of the present disclosure.

FIG. 3 illustrates an example imaging environment 300 with a three-dimensional (3D) camera system. In this example, the 3D camera system is TOF camera 202 (also referred to as a TOF sensor or TOF camera sensor) described above with respect to FIG. 2. In some examples, TOF camera 202 can be used to implement the systems and techniques described herein. For example, TOF camera 202 can include a range imaging camera system that resolves distance based on the speed of light, a measured time-of-flight of a light signal between the camera and target in the scene for each point of a captured frame.

As explained previously, TOF camera 202 can work by illuminating a scene with a transmitted light 320 (e.g., transmitted signal, modulated output/signal, incident light, or emitted light/signal) and observing (e.g., receiving, capturing or recording, sensing, measuring, analyzing, etc.) a received light 322 (e.g., received signal, backscattered light/signal, or reflected signal/light) that is backscattered (e.g., reflected) by target 350. In the illustrative example of FIG. 3, TOF camera 202 can include a local oscillator clock 302 (e.g., radio frequency (RF) oscillator), a phase shifter 304 at a transmission channel, a driver 306, a light source 308, and a transmit optical system 310.

In some cases, local oscillator clock 302 can include any applicable type of oscillator clock, otherwise referred to as a radio frequency (RF)-oscillator clock. Local oscillator clock 302 can generate a clock signal that is ultimately used in modulating an output signal of TOF camera 202 (e.g., transmitted light 320 and in demodulating the TOF pixels on the sensor array (TOF sensor chip 314)). In some aspects, phase shifter 304 can receive the clock signal generated by local oscillator clock 302 and delay it for purposes of creating a phase adjusted input. While phase shifter 304 is shown as being implemented on the transmitting channel, in various examples, phase shifter 304 can be implemented in the receiving channel of TOF camera 202. For example, phase shifter 304 can be implemented in the receiving channel to affect modulation of the signal generated by light source 308. For example, phase shifter 304 can be implemented between TOF sensor chip 314 and local oscillator clock 302 or directly integrated with the TOF sensor chip 314.

In some examples, driver 306 can receive the phase adjusted clock signal from phase shifter 304 and modulate the signal based on the phase adjusted clock signal to generate modulated output (e.g., transmitted light 320) from light source 308. In some examples, the illumination of TOF camera 202 can be generated by light source 308. Light source 308 can include, for example and without limitation, a solid-state laser (e.g., a laser diode (LD), a vertical-cavity surface-emitting laser (VCSEL), etc.), a light-emitting diode (LED), etc.), a lamp, and/or any other light emitter or light emitting device.

In some aspects, transmitted light 320 (e.g., modulated output from light source 308) can pass through transmit optical system 310 and be transmitted towards a target 350 in a scene. In some cases, target 350 can include any type of target, surface, interface, and/or object such as, for example and without limitation, a human, an animal, a vehicle, a tree, a structure (e.g., a building, a wall, a shelter such as a bus stop shelter, etc.), an object, a surface, a device, a material with a refractive index that allows at least some light (e.g., transmitted light 320, ambient light, etc.) to be reflected/backscattered from the material, and/or any other target, surface, interface, and/or object in a scene.

In the illustrative example of FIG. 3, TOF camera 202 includes a receiving optical system 312, a TOF sensor chip 314, and a controller and computing system 316 supporting an application 318. In the example environment 300, when transmitted light 320 (e.g., an RF modulated infrared (IR) optical signal with an equal wave front) interacts with target 350, at least some of transmitted light 320 can be reflected back towards TOF camera 202 as a received light 322 (e.g., backscattered signal, light incident on TOF camera 202, etc.).

In some examples, received light 322 passes through receiving optical system 312 to TOF sensor chip 314. In some cases, received light 322 can include the RF modulated IR optical signal backscattered with different time-of-flight delays. The different TOF delays in received light 322 can represent, or otherwise encode, 3D information of target 350. As used herein, 3D information of a target can include applicable information defining characteristics of a target in 3D space. For example, 3D information of a target can include range information that describes a distance between a reference and the target or a portion of the target.

In some examples, the light that is received by and/or enters (e.g., the light incident on) receiving optical system 312 and/or TOF sensor chip 314 can include a reflected component. In other examples, the light that is received by and/or enters (e.g., the light incident on) entering receiving optical system 312 and/or TOF sensor chip 314 can include a reflected component as well as an ambient component. In some examples, the distance (e.g., depth) information may be embedded in, measured from, and/or defined by the reflected component or may only be embedded in the reflected component. As such, a certain amount of (and/or any amount of) an ambient component can reduce the signal-to-noise ratio (SNR).

In some examples, TOF depth image processing methods can include collecting correlation samples (CSs) to calculate a phase estimate. For example, correlation samples of a TOF pixel and/or image can be collected at one or more time points, such as sequential time points, and at different phase shift/offset conditions. The signal strength of the correlation samples varies with the different phase shifts. As such, these samples output from the TOF pixel and/or image have different values.

In some cases, TOF sensor chip 314 can detect varying TOF delays in received light 322. As follows, TOF sensor chip 314 can communicate with controller and computing system 316 to process the TOF delays and generate 3D information based on the TOF delays.

In some aspects, controller and computing system 316 support application 318 that performs further signal processing and controls various functional aspects, for example, based on the 3D information. For example, application 318 can control or facilitate control of an AV (e.g., AV 102 as illustrated in FIG. 1) based on the 3D information.

As explained, the light from a modulated light source (e.g., transmitted light 320) is backscattered by target 350 in the field of view of TOF camera 202, and the phase shift between transmitted light 320 and received light 322 can be measured. By measuring the phase shift at multiple modulation frequencies, a depth value for each pixel can be calculated. For example, based on a continuous-wave (CW) method, TOF camera 202 can take multiple samples per measurement, with each sample phase-stepped by, e.g., 90 degrees, for a total of four samples. Using this technique, TOF camera 202 can calculate the phase angle between illumination and reflection and the distance associated with target 350. In some cases, a reflected amplitude (A) and an offset (B) can have an impact on the depth measurement precision or accuracy. Moreover, TOF camera 202 can approximate the depth measurement variance. In some cases, the reflected amplitude (A) can be a function of the optical power, and the offset (B) can be a function of the ambient light and residual system offset.

When received light 322 arrives at a TOF sensor of TOF camera 202 (e.g., through a lens of TOF camera 202), each pixel of the TOF sensor demodulates the RF-modulated light 322 generated by electrons and concurrently integrates the photogenerated charges in pixel capacitors at multiple phase shift steps or phase offsets at multiple phase windows. In this way, TOF camera 202 can acquire a set of raw TOF data. TOF camera 202 can then process the raw TOF data. For example, TOF camera 202 can demodulate the time-of-flight and use the time-of-flight to calculate the distance from TOF camera 202 to target 350. In some cases, TOF camera 202 can also generate an amplitude image and a grayscale image.

The distance demodulation can establish the basis for estimating depth by TOF camera 202. In some cases, there can be multiple capacitors (e.g., $C_A$, $C_B$) and multiple integral windows with a phase difference $\pi$ under each pixel of the TOF sensor of TOF camera 202. In one sampling period, the pixel can be designed with electronics and capacitors that can process and accumulate the differential charge or samples. This process is called differential correlation sampling (DCS). In an example implementation of a 4-DCS method, the capacitors can sample a signal four times at four phases such as 0°, 90°, 180° and 270° phases. TOF camera 202 can use the sample results (e.g., $DCS_1$, $DCS_2$, $DCS_3$, $DCS_4$ sampled at different phase shifts between transmitted light 320 and received light 322 to calculate the distance of target 350 (relative to the TOF camera 202) based on the phase shift.

Figure 5B:
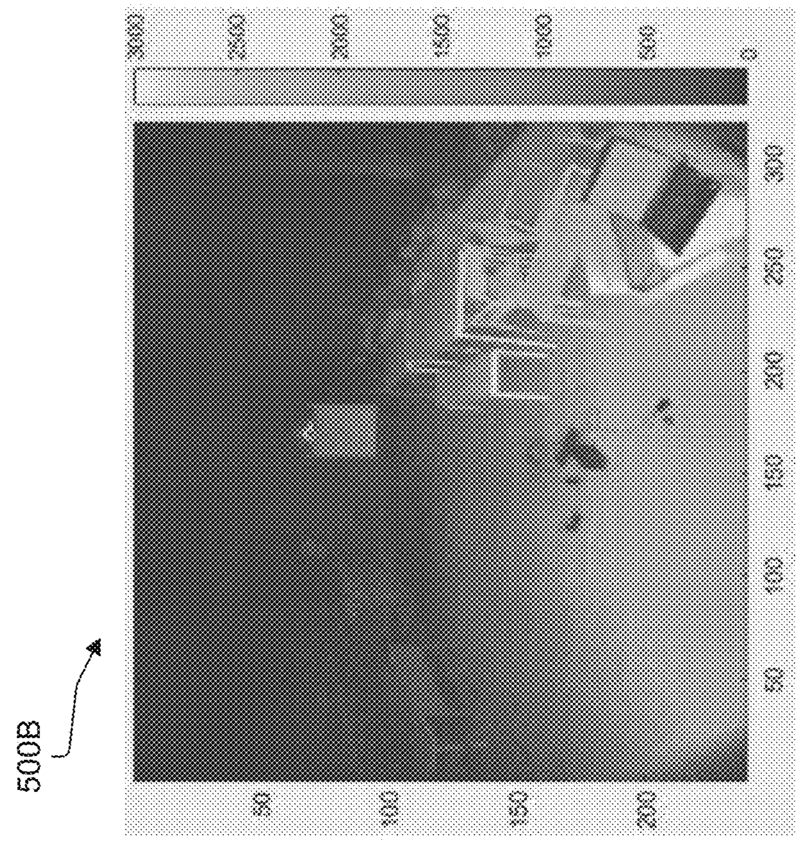
FIG. 5B illustrates an example amplitude image corresponding to a depth map illustrated in FIG. 5A, according to some examples of the present disclosure.
Figure 5A:
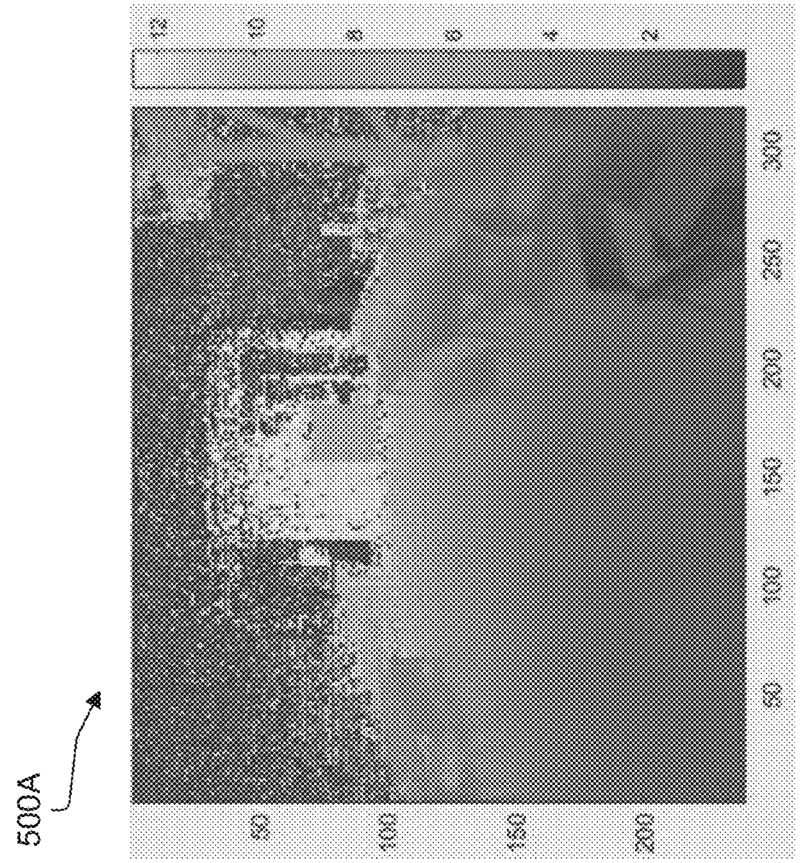
FIG. 5A illustrates an example depth map captured by a sensor, according to some examples of the present disclosure.

In some examples, TOF camera 202 can measure a distance for every pixel to generate a depth map (e.g., depth map 500A as illustrated in FIG. 5A). A depth map can include a collection of 3D points (e.g., each point is also known as a voxel). In some cases, the depth map can be rendered in a two-dimensional (2D) representation or image. In other cases, a depth map can be rendered in a 3D space as a collection of points or point cloud. In some examples, the 3D points can be mathematically connected to form a mesh onto which a texture surface can be mapped.

In some cases, the systems and techniques described herein can determine precision of the depth map (e.g., 3D point cloud) based on a set of depth data and corresponding grayscale image data of a single frame. In order to account for both active light (e.g., light from active light source such as light source 308) and passive light (e.g., ambient light), the system can scale noise from the active light and the passive light. For example, depth data can provide information relating to one or more parameters associated with active light and grayscale image data can provide information relating to one or more parameters associated with passive light. As such, an estimated precision based on a TOF system model can be determined by Equation (1) below as follows:

$$CM = C_1 * \frac{\sqrt{C_2 \cdot A_{TOF} + C_3 \cdot GS + C_4}}{A_{TOF}} \qquad \text{Equation (1)}$$

where CM is the precision predicting confidence map for each pixel at TOF sensor location index (i,j) (the index (i,j) is dropped but implied, the same for $A_{TOF}$ and GS), $C_1$ represents a system constant based on an optical speed, a pixel modulation frequency, and a number of phase shifts; $C_2$ represents a conversion constant with an inversion of the demodulation efficiency or the modulation contrast; $C_3$ represents a grayscale modification coefficient; $C_4$ represents a system noise variance in digital number; $A_{TOF}$ represents an amplitude of received modulated signal in digital number; and GS represents grayscale of a single captured frame in digital number.

In some examples, the system constant $C_1$ can be determined based on Equation (2) below, as follows:

$$C_1 = \frac{C}{f \cdot \pi \cdot \sqrt{8 \cdot N}} \quad \text{Equation (2)}$$

where C represents an optical speed (e.g., speed of light in vacuum) and equals to $3\times10^8$ [m/s]; f represents TOF pixel modulation frequency [Hz]; and N represents the number of phase shift(s). In some examples, parameters $C_2$, $C_3$, $C_4$ include variables that are subject to changes with different types of a TOF camera and the integration time used for the modulated signal and ambient light. Details of abstraction of parameters $C_1$ through $C_4$ are illustrated below with respect to FIG. 4.

In some aspects, the system can generate a confidence map indicating an estimated precision and/or reliability of the signal (e.g., TOF measurements). In some examples, the confidence map can be generated based on pixel-wise operations used to determine, for each pixel of a signal captured by TOF camera 202, precision and/or reliability of the measurement. For example, the system can generate a mask representing a confidence map indicating precision of each pixel of a correlation sample captured by TOF camera 202. In some cases, the system can determine whether an estimated precision of each pixel of a correlation sample captured by TOF camera 202 is above or below a precision threshold. For example, if an estimated precision of a pixel is above a precision threshold, the system can set a confidence map value corresponding to that pixel to 0. If an estimated precision of a pixel is below a precision threshold, TOF camera 202 can set a confidence map value corresponding to that pixel to 1.

Figure 4:
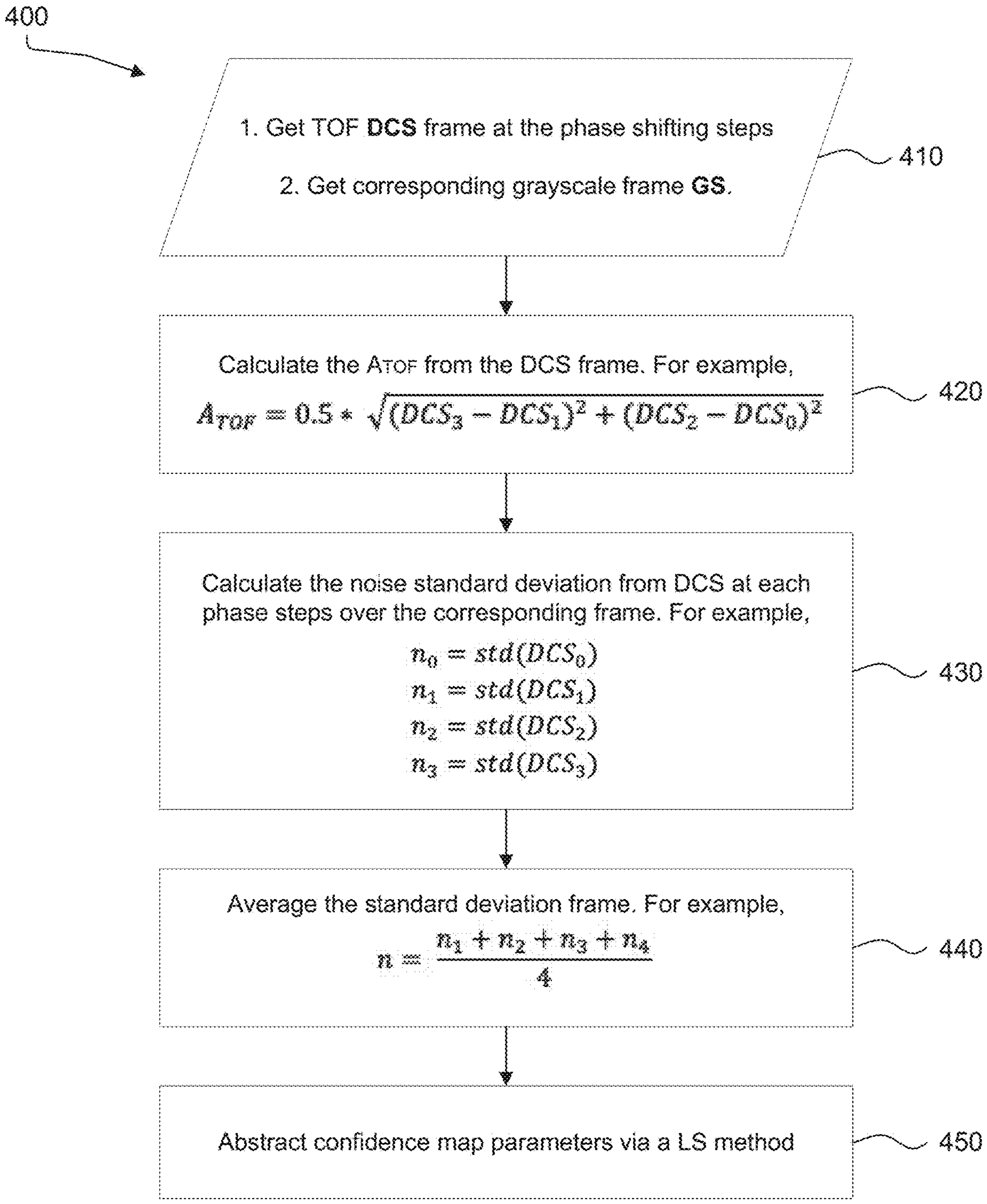
FIG. 4 is a flowchart illustrating an example process of signal processing to determine noise parameters, according to some examples of the present disclosure.

FIG. 4 is a flowchart illustrating an example process 400 of signal processing to determine noise parameters. At block 410, process 400 includes receiving a set of depth data and grayscale image data. For example, the system can receive depth data of a single frame, which is captured by a TOF camera (e.g., TOF camera 202). Further, the system can receive, from the TOF camera (e.g., TOF camera 202), grayscale image data of the corresponding frame (e.g., the same TOF pixel and/or image corresponding to the grayscale image data). As previously described, depth data can provide information relating to noise from active light (e.g., light generated from a light source of TOF camera such as light source 308 of TOF camera 202) and grayscale image data can provide information relating to noise from passive light (e.g., ambient light).

At block 420, process 400 includes calculating (as an example using a phase-shifting method such as a 4-phase shifting method) an amplitude of the received signal (e.g., received light 322 as illustrated in FIG. 3). The amplitude of the received modulated light/signal $A_{TOF}$, which in direct relationship to the shot noise of the modulated light, can be calculated using Equation (3). As described previously, the reflected modulated signal (e.g., received light 322) can be sampled synchronously with the envelope four times period to generate four correlation samples (CSs or also referred to as differential correlation samples (DCSs)) $CS_1$, $CS_2$, $CS_3$, $CS_4$, for example, at 0°, 90°, 180° and 270° phases. These four samples (e.g., $CS_1$, $CS_2$, $CS_3$, $CS_4$) can be used for the calculation of the amplitude $A_{TOF}$ (from which the intensity image can be obtained) as shown below. In general, these four samples/CSs (e.g., $CS_1$, $CS_2$, $CS_3$, $CS_4$) may have a common mode or the same systematic bias, and may be canceled in Equation (3) below.

$$A_{TOF} = \frac{\sqrt{(CS_3 - CS_1)^2 + (CS_2 - CS_0)^2}}{2} \quad \text{Equation (3)}$$

where $CS_0$ represents the CS at 0-th phase shifting (e.g., at 0°); $CS_1$ represents the CS at $1^{st}$ phase shifting (e.g., at 90°); $CS_2$ represents the CS at $2^{nd}$ phase shifting (e.g., at 180°); and $CS_3$ represents the CS at $3^{rd}$ phase shifting (e.g., at 270°).

In some cases, DCS refers to a correlation signal for a TOF pixel with on-chip differential operation for suppressing the ambient light generated by photon-electrons to prevent the saturation. In some examples, DCS can be mathematically calculated based on Equation (4) below.

$$DCS_k = \Delta + A_{TOF} \cdot \cos(\varphi_d + \psi_k) + H(n) + n(t),\ k = 0, 1, 2, \ldots \quad \text{Equation (4)}$$

where k represents the index of phase delay steps; $DCS_k$ represents the DCS at k-th phase shifting; Δ represents the residual of ambient light induced offset due to the imperfect differential operation; $A_{TOF}(f)$ represents the amplitude of the TOF demodulated signals at given modulation frequency f condition; $\varphi_d$ represents the TOF caused phase delay carrying distance information; $\psi_k$ represents the TOF system phase shifting; H(n) represents the high orders of the harmonics, causing phase error by certain algorithms used; and n(t) represents all temporal noises generated by VCSEL, pixel, si-device, system, analog-to-digital converter (ADC), and so on.

At block 430, process 400 includes calculating a noise parameter, such as a noise standard deviation, from correlation samples (e.g., CSs or DCSs) at each phase step over the corresponding frame. For example, the correlation sample noise of the frame at each phase shift step can be calculated based on Equations (5) through (8) below.

$$n_0 = std(CS_0) \quad \text{Equation (5)}$$

$$n_1 = std(CS_1) \quad \text{Equation (6)}$$

$$n_2 = std(CS_2) \quad \text{Equation (7)}$$

$$n_3 = std(CS_3) \quad \text{Equation (8)}$$

In some examples, the standard deviations $n_0$, $n_1$, $n_2$, $n_3$ refer to noise with the respective DCS frame. As such, a statistical evaluation can be done with multiple DCS frames to get the noise feature (e.g., the standard deviation of each frame). In some cases, DCS may have a different value at each phase shift step, but the noise standard deviations may be the same at the same condition of active optical power and ambient light condition.

At block 440, process 400 includes averaging the noise parameters, such as the noise standard deviations, at each phase shift step to determine the CS noise of the TOF frame. For example, the noise of the TOF frame (n) can be calculated based on Equation (9) below.

$$n = \frac{n_1 + n_2 + n_3 + n_4}{4} \quad \text{Equation (9)}$$

At block 450, process 400 includes determining (e.g., abstracting) one or more parameters based on a least squares (LS) method. The parameters can be used in the calculation of an estimated precision of TOF measurements such as $C_1$ through $C_4$ in Equation (1). For the purposes of simplicity, the pixel location index (i,j) on the frame can be implied for all variables. In some cases, the CS noise variant formulation can be defined by Equation (10) below.

$$n^2 = c_2 \cdot A_{TOF} + c_3 \cdot GS + c_4 \quad \text{Equation (10)}$$

A normal equation can be used to find least squares solutions as shown in Equation (11) below.

$$E = \sum (c_2 \cdot A_{TOF} + c_3 \cdot GS + c_4 - n^2)^2 \quad \text{Equation (11)}$$

Derivation of the normal equation can be expressed as Equations (12) through (14) below.

$$\frac{\partial E}{\partial c_2} = 2\sum (c_2 \cdot A_{TOF} + c_3 \cdot GS + c_4 - n^2) \cdot A_{TOF} = 0 \quad \text{Equation (12)}$$

$$\frac{\partial E}{\partial c_3} = 2\sum (c_2 \cdot A_{TOF} + c_3 \cdot GS + c_4 - n^2) \cdot GS) = 0 \quad \text{Equation (13)}$$

$$\frac{\partial E}{\partial c_4} = 2\sum (c_2 \cdot A_{TOF} + c_3 \cdot GS + c_4 - n^2) \cdot 1 = 0 \quad \text{Equation (14)}$$

As such, the linear equation system for parameters $c_2$, $c_3$, $C_4$ can be solved with Equations (15) through (17) below.

$$c_2 \cdot \sum A_{TOF}{}^2 + c_3 \cdot \sum (GS \cdot A_{TOF}) + c_4 \cdot \sum A_{TOF} = \sum n^2 \cdot A_{TOF} \quad \text{Equation (15)}$$

$$c_2 \cdot \sum (A_{TOF} \cdot GS) + c_3 \cdot \sum GS^2 + c_4 \cdot \sum GS = \sum n^2 \cdot GS \quad \text{Equation (16)}$$

$$c_2 \cdot \sum A_{TOF} + c_3 \cdot \sum GS + c_4 \cdot \sum 1 = \sum n^2 \quad \text{Equation (17)}$$

As previously illustrated, $c_2$ represents the noise variant conversion factor; $c_3$ represents the noise conversion factor of ambient light at the given tint of the grayscale image data; and $c_4$ represents the variance of the system noise in dark in digital number.

In some cases, one or more parameters associated with the calculation of an estimated precision as described above can be obtained via a machine learning process. For example, one or more compute components 210 as illustrated in FIG. 2 can implement one or more software engines and/or algorithms (e.g., data processing engine 220) or a machine learning model(s), a computer vision algorithm(s), a neural network(s), and/or any other algorithm and/or component to output one or more parameters associated with the calculation of an estimated precision of TOF measurements (e.g., noise parameters).

FIG. 5A illustrates an example depth map 500A captured by a sensor (e.g., TOF camera 202). In some examples, depth map 500A represents depth information estimated for a target in a scene. Each point in depth map 500A (or the point cloud if converted to the x, y, z coordinate system) represents a single pixel in the image, and the position of the pixel in depth map 500A (or the point cloud) corresponds to its location in the scene. For example, TOF camera 202 can generate depth map 500A (e.g., 3D point cloud), which consists of a collection of 3D points that represent the surfaces of target(s)/object(s) in a scene (e.g., a human, an object, a vehicle, a traffic sign, an animal, a building, a scene element, a device, a structure, etc.).

FIG. 5B illustrates an example amplitude image 500B corresponding to a depth map illustrated in FIG. 5A. In some examples, amplitude image 500B represents the active light intensity (e.g., $A_{TOF}$) based on the active light from a light source of a TOF sensor (e.g., light source 308 of TOF camera 202). In some cases, amplitude image data (e.g., amplitude image 500B) can be basis for abstracting noise parameters associated with active light.

Figure 5D:
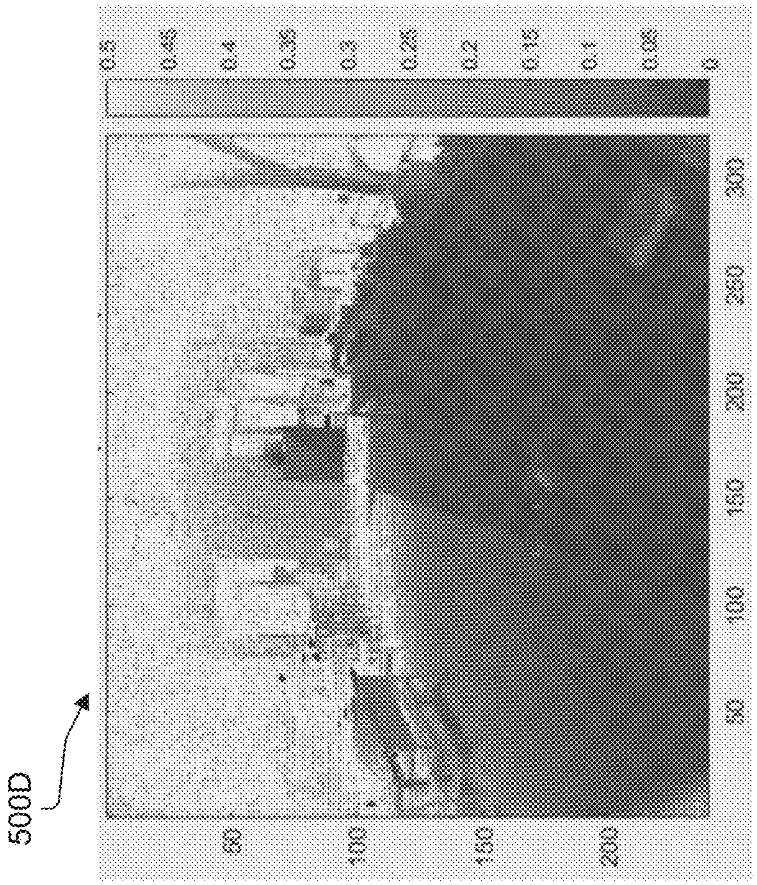
FIG. 5D illustrates an example confidence map corresponding to a depth map and grayscale map generated according to some examples of the present disclosure.
Figure 5C:
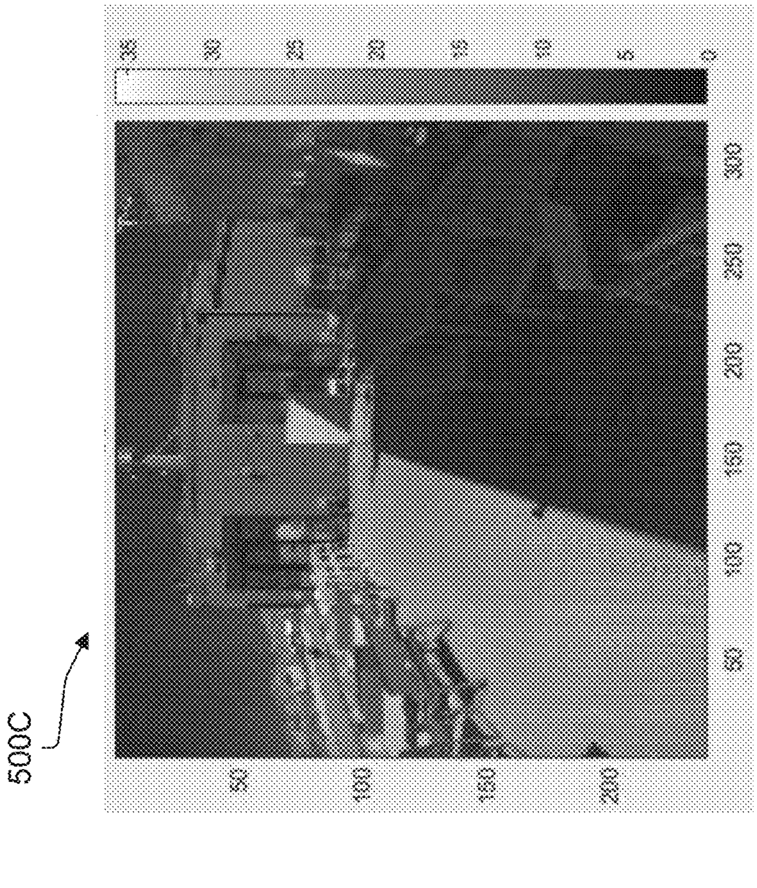
FIG. 5C illustrates a grayscale image corresponding to a depth map illustrated in FIG. 5A, according to some examples of the present disclosure.

FIG. 5C illustrates a grayscale image 500C corresponding to a depth map illustrated in FIG. 5A. In some examples, grayscale image 500C can be based on ambient light. As follows, grayscale image data (e.g., grayscale image 500C) can be basis for abstracting noise parameters associated with passive light (e.g., ambient light).

FIG. 5D illustrates an example confidence map 500D corresponding to a depth map 500A (or point cloud) and a grayscale image 500C generated in accordance with some examples of the present disclosure. For example, confidence map 500D can be generated based on depth data of a single frame (e.g., depth map 500A) and grayscale image data of the single frame (e.g., grayscale image 500C) to indicate an estimated precision of TOF measurement(s) for each pixel. In the illustrative example of FIG. 5D, confidence map 500D can include a range of mask values (e.g., from 0 to 0.5) used to indicate an estimated precision of TOF measurement(s).

Figure 6:
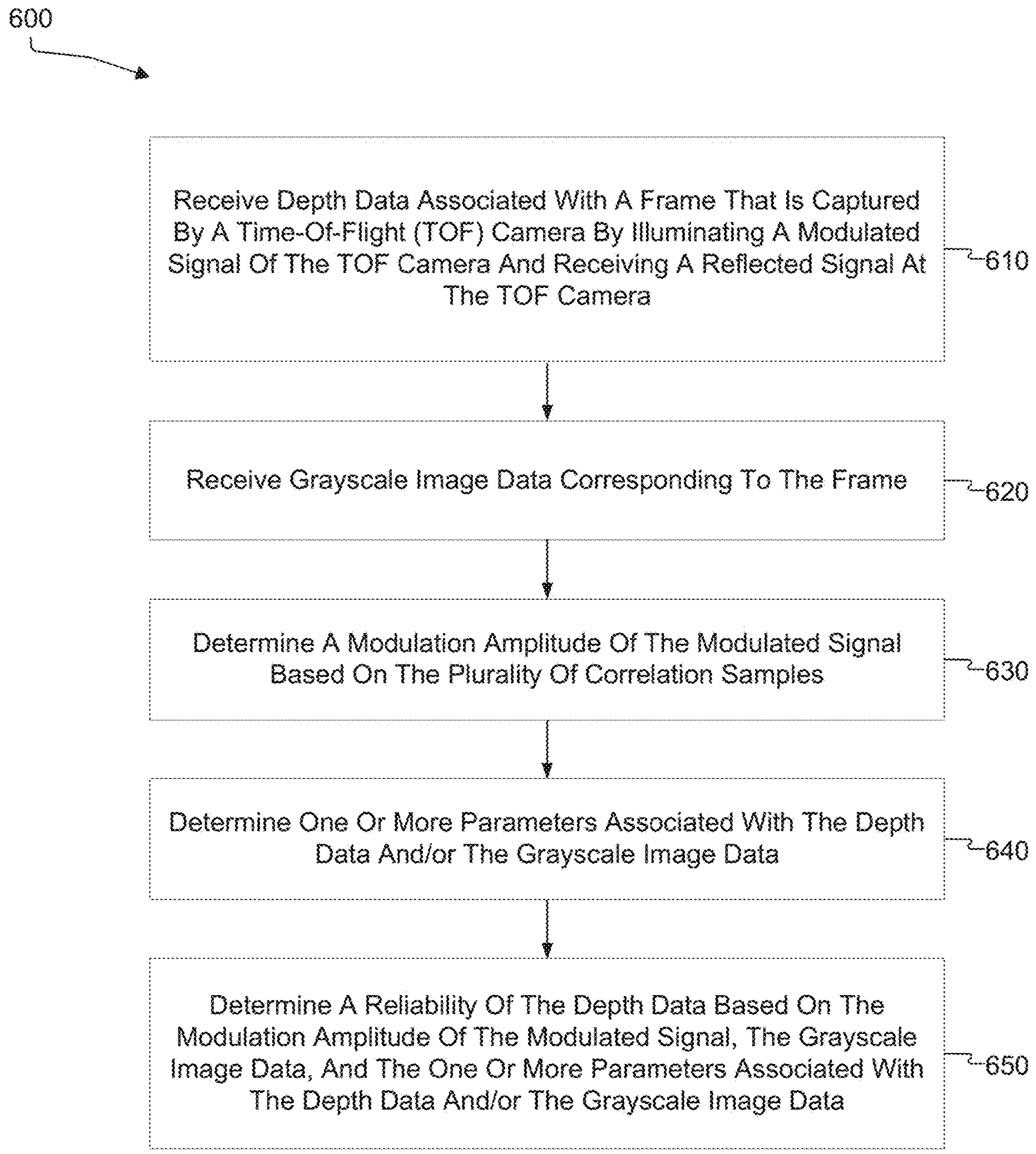
FIG. 6 is a flowchart illustrating an example process for determining a precision of TOF measurements based on sensor data of a single frame, according to some examples of the present disclosure.

FIG. 6 is a flowchart illustrating an example process 600 for determining precision of TOF measurements based on sensor data of a single frame. Although the example process 600 depicts a particular sequence of operations, the sequence may be altered without departing from the scope of the present disclosure. For example, some of the operations depicted may be performed in parallel or in a different sequence that does not materially affect the function of process 600. In other examples, different components of an example device or system that implements process 600 may perform functions at substantially the same time or in a specific sequence.

At block 610, process 600 includes receiving depth data associated with a frame, the depth data being captured by a time-of-flight (TOF) camera by illuminating a modulated signal of the TOF camera and receiving a reflected signal at the TOF camera. In some examples, the depth data can include a plurality of correlation samples (CSs) based on the reflected signal. For example, the system can receive depth data (e.g., depth map 500A) associated with a frame, which is captured by TOF camera 202 by illuminating transmitted light 320 and obtaining (e.g., receiving, capturing, recording, analyzing, etc.) received light 322. The depth data (e.g., depth map 500A) may comprise information relating to correlation samples (e.g., $CS_1$, $CS_2$, $CS_3$, $CS_4$), which can provide information relating to noise from active light (e.g., transmitted light 320 from light source 308 of TOF camera 202).

At block 620, process 600 includes receiving grayscale image data corresponding to the frame. For example, the system can receive grayscale image data 500C that corresponds to depth map 500A. In some examples, the grayscale image data can provide information relating to noise from ambient light in the scene.

At block 630, process 600 includes determining a modulation amplitude of the modulated signal based on the plurality of correlation samples. For example, TOF camera 202 can take multiple samples per measurement, with each sample phase-shifted by, e.g., 90 degrees, for a total of four correlation samples (e.g., $CS_1$, $CS_2$, $CS_3$, $CS_4$). Based on the correlation samples, the system can determine the modulation amplitude (e.g., $A_{TOF}$) as shown in Equation (3):

$$A_{TOF} = \frac{\sqrt{(CS_3 - CS_1)^2 + (CS_2 - CS_0)^2}}{2} \quad \text{Equation (3)}$$

At block 640, process 600 includes determining one or more parameters associated with at least one of the depth data and the grayscale image data. In some examples, the one or more parameters include a system constant $C_1$, which represents a system constant based on a speed of light in vacuum, a modulation frequency of TOF camera 202, and a number of phase shifts (e.g., 4 phase shifts at 0°, 90°, 180°, 270°) as provided in Equation (2).

In some cases, the one or more parameters include an inversion of a modulation efficiency or a modulation contrast (e.g., $C_2$ in Equation (1)), a noise conversion factor relating to an integration (tint) of grayscale image data 500C (e.g., $C_3$ in Equation (1)), and a noise floor in dark in digital number (e.g., $C_4$ in Equation (1)).

At block 650, process 600 includes determining a reliability of the depth data based on the modulation amplitude of the modulated signal, the grayscale image data, and the one or more parameters associated with at least one of the depth data and the grayscale image data. For example, the system can determine a reliability of the depth data (e.g., an estimated precision of the depth data) based on the modulation amplitude $A_{TOF}$, grayscale image data (e.g., grayscale image 500C), and one or more parameters $C_1$ through $C_4$ as described herein. In some examples, an estimated precision of the depth data can be mathematically calculated based on Equation (1) as illustrated above.

$$CM = C_1 \cdot \frac{\sqrt{C_2 \cdot A_{TOF} + C_3 \cdot GS + C_4}}{A_{TOF}} \quad \text{Equation (1)}$$

In some examples, based on the estimated precision (e.g., reliability) of the depth data, the system can generate a confidence map (e.g., confidence map 500D) that uses mask values to indicate an estimated confidence or reliability/precision of specific pixels in confidence map 500D. In some examples, a confidence map can be used to label 3D point clouds (e.g., depth map) with predicted precision for each TOF pixel. In some aspects, a confidence map can be used to mask and threshold one or more pixels with estimated precision (e.g., digital distribution from 0 to 1). For example, the system can determine whether an estimated precision of each pixel of a correlation sample captured by TOF camera 202 is above or below a predetermined precision threshold. For example, if an estimated precision of a pixel is above a precision threshold, the system can set a confidence map value corresponding to that pixel to 0. If an estimated precision of a pixel is below a precision threshold, TOF camera 202 can set a confidence map value corresponding to that pixel to 1.

Figure 7:
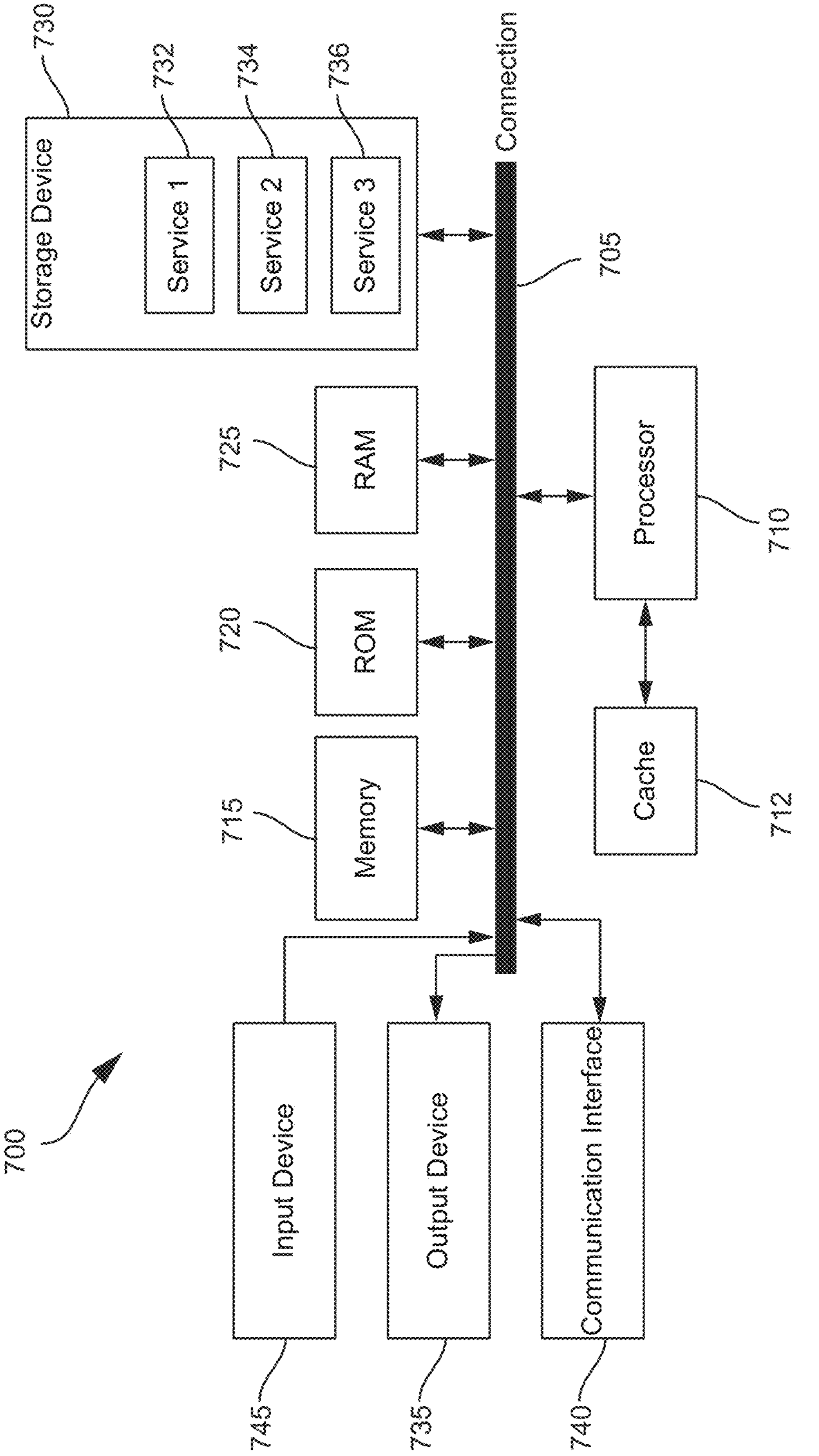
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communication interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some examples, a hardware service that performs a particular function can include the software component stored in a computer-readable medium in connection with the necessary hardware components, such as processor 710, connection 705, output device 735, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments.

Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: receive depth data associated with a frame, the depth data being captured by a time-of-flight (TOF) camera by illuminating a modulated signal of the TOF camera and receiving a reflected signal at the TOF camera, wherein the depth data comprises a plurality of correlation samples based on the reflected signal; receive, from the TOF camera, grayscale image data corresponding to the frame; determine a modulation amplitude of the modulated signal based on the plurality of correlation samples; determine one or more parameters associated with at least one of the depth data and the grayscale image data; and determine a reliability of the depth data based on the modulation amplitude of the modulated signal, the grayscale image data, and the one or more parameters associated with at least one of the depth data and the grayscale image data.

Aspect 2. The system of Aspect 1, wherein the plurality of correlation samples comprise four samples that are obtained by phase shifting the reflected signal by 90 degrees.

Aspect 3. The system of Aspects 1 or 2, wherein the one or more parameters include a constant associated with a modulation frequency of the TOF camera and a number defining a phase shift.

Aspect 4. The system of any of Aspects 1 to 3, wherein the one or more parameters include an inversion of a demodulation efficiency or a modulation contrast.

Aspect 5. The system of any of Aspects 1 to 4, wherein the one or more parameters include a noise conversion factor relating to a tint of the grayscale image data.

Aspect 6. The system of any of Aspects 1 to 5, wherein the one or more parameters include a noise floor in dark.

Aspect 7. The system of any of Aspects 1 to 6, wherein the one or more parameters are determined based on a least squares approximation.

Aspect 8. The system of any of Aspects 1 to 7, wherein the one or more processors are configured to: generate a confidence map comprising a representation of mask values associated with pixels of the plurality of correlation samples.

Aspect 9. The system of any of Aspects 1 to 8, wherein the one or more processors are configured to: label each pixel of the depth data of the frame with the reliability.

Aspect 10. The system of any of Aspects 1 to 9, wherein the one or more processors are configured to: mask one or more pixels of the depth data that have the reliability below a precision threshold.

Aspect 11. A method comprising: receiving depth data associated with a frame, the depth data being captured by a time-of-flight (TOF) camera by illuminating a modulated signal of the TOF camera and receiving a reflected signal at the TOF camera, wherein the depth data comprises a plurality of correlation samples based on the reflected signal; receiving, from the TOF camera, grayscale image data corresponding to the frame; determining a modulation amplitude of the modulated signal based on the plurality of correlation samples; determining one or more parameters associated with at least one of the depth data and the grayscale image data; and determining a reliability of the depth data based on the modulation amplitude of the modulated signal, the grayscale image data, and the one or more parameters associated with at least one of the depth data and the grayscale image data.

Aspect 12. The method of Aspect 11, wherein the one or more parameters include a constant associated with a modulation frequency of the TOF camera and a number defining a phase shift.

Aspect 13. The method of Aspects 11 or 12, wherein the one or more parameters include an inversion of a demodulation efficiency or a modulation contrast.

Aspect 14. The method of any of Aspects 11 to 13, wherein the one or more parameters include a noise conversion factor relating to a tint of the grayscale image data.

Aspect 15. The method of any of Aspects 11 to 14, wherein the one or more parameters include a noise floor in dark.

Aspect 16. The method of any of Aspects 11 to 15, wherein the one or more parameters are determined based on a least squares approximation.

Aspect 17. The method of any of Aspects 11 to 16, further comprising: generating a confidence map comprising a representation of mask values associated with pixels of the plurality of correlation samples.

Aspect 18. The method of any of Aspects 11 to 17, further comprising: labeling each pixel of the depth data of the frame with the reliability.

Aspect 19. The method of claim 11, further comprising: masking one or more pixels of the depth data that have the reliability below a precision threshold.

Aspect 20. A non-transitory computer-readable storage medium comprising at least one instruction for causing a computer or processor to perform method according to any of Aspects 11 to 19.

What is claimed is:

1. A system comprising:

a time-of-flight (TOF) camera having a light transmitter, a light receiver, and a sensor chip;

a memory; and one or more processors coupled to the memory and the TOF camera, the one or more processors being configured to:

illuminate one or more targets in a scene proximal to the TOF camera with a modulated signal from the light transmitter, the modulated light signal being scattered off the one or more targets such that a reflected modulated signal is received at the light receiver and processed by the sensor chip to generate a video sequence of the scene comprising a plurality of frames, wherein each of the plurality of frames includes a pixel array representing the scene;

receive, for each of the plurality of frames of the video sequence, depth data associated with a respective frame, the depth data comprising a plurality of correlation samples based on the reflected modulated signal associated with the respective frame;

receive, from the sensor chip, for each respective frame, grayscale image data corresponding to the respective frame;

determine, for each respective frame, a modulation amplitude of the reflected modulated signal based on the plurality of correlation samples;

determine, for each respective frame, one or more parameters associated with at least one of the depth data and the grayscale image data;

determine, for each respective frame, a reliability of the depth data comprising an estimated precision of TOF measurement(s) for each pixel of the pixel array, based on the modulation amplitude of the reflected modulated signal, the grayscale image data, and the one or more parameters associated with at least one of the depth data and the grayscale image data;

generate, for each respective frame, a confidence map comprising mask values for each pixel of the pixel array by comparing the estimated precision for each pixel to a precision threshold; and mask, for each respective frame, one or more pixels of the pixel array based on the mask values.

2. The system of claim 1, wherein the plurality of correlation samples comprise four samples that are obtained by phase shifting the reflected signal by 90 degrees.

3. The system of claim 1, wherein the one or more parameters include a constant associated with a modulation frequency of the TOF camera and a number defining a phase shift.

4. The system of claim 1, wherein the one or more parameters include an inversion of a demodulation efficiency or a modulation contrast.

5. The system of claim 1, wherein the one or more parameters include a noise conversion factor relating to a tint of the grayscale image data.

6. The system of claim 1, wherein the one or more parameters include a noise floor in dark.

7. The system of claim 1, wherein the one or more parameters are determined based on a least squares approximation.

8. The system of claim 1, wherein the one or more processors are configured to:

generate, for each respective frame, a confidence map comprising a representation of mask values associated with pixels of the plurality of correlation samples, wherein the one or more processors are configured to set a confidence map value corresponding to a pixel to 0 when the reliability of the pixel is above the precision threshold, and set the confidence map value corresponding to the pixel to 1 when the reliability of the pixel is below the precision threshold.

9. The system of claim 1, wherein the one or more processors are configured to:

label each pixel of the depth data of each respective frame with the reliability.

10. The system of claim 1, wherein the one or more processors are configured to:

mask and threshold one or more pixels of the depth data of each respective frame that have the reliability below the precision threshold based on the confidence map.

11. A method comprising:

illuminating one or more targets in a scene proximal to a time-of-flight (TOF) camera with a modulated signal from a light transmitter, the modulated light signal being scattered off the one or more targets in the scene such that a reflected modulated signal is received at a light receiver and processed by a sensor chip to generate a video sequence of the scene comprising a plurality of frames, wherein each of the plurality of frames includes a pixel array representing the scene;

receiving, for each of the plurality of frames of the video sequence, depth data associated with a respective frame, the depth data comprising a plurality of correlation samples based on the reflected signal;

receiving, from the sensor chip, for each respective frame, grayscale image data corresponding to the respective frame;

determining, for each respective frame, a modulation amplitude of the reflected modulated signal based on the plurality of correlation samples;

determining, for each respective frame, one or more parameters associated with at least one of the depth data and the grayscale image data;

determining, for each respective frame, a reliability of the depth data comprising an estimated precision of TOF measurement(s) for each pixel of the pixel array, based on the modulation amplitude of the reflected modulated signal, the grayscale image data, and the one or more parameters associated with at least one of the depth data and the grayscale image data;

generating, for each respective frame, a confidence map comprising mask values for each pixel of the pixel array by comparing the estimated precision for each pixel to a precision threshold; and masking, for each respective frame, one or more pixels of the pixel array based on the mask values.

12. The method of claim 11, wherein the one or more parameters include a constant associated with a modulation frequency of the TOF camera and a number defining a phase shift.

13. The method of claim 11, wherein the one or more parameters include an inversion of a demodulation efficiency or a modulation contrast.

14. The method of claim 11, wherein the one or more parameters include a noise conversion factor relating to a tint of the grayscale image data.

15. The method of claim 11, wherein the one or more parameters include a noise floor in dark.

16. The method of claim 11, wherein the one or more parameters are determined based on a least squares approximation.

17. The method of claim 11, further comprising:

generating, for each respective frame, a confidence map comprising a representation of mask values associated with pixels of the plurality of correlation samples, wherein a confidence map value corresponding to a pixel is set to 0 when the reliability of the pixel is above the precision threshold, and the confidence map value corresponding to the pixel is set to 1 when the reliability of the pixel is below the precision threshold.

18. The method of claim 11, further comprising:

labeling each pixel of the depth data of the frame with the reliability.

19. The method of claim 11, further comprising:

masking and thresholding one or more pixels of the depth data of each respective frame that have the reliability below the precision threshold based on the confidence map.

20. A non-transitory computer-readable medium having stored thereon instructions which, when executed by one or more processors, cause the one or more processors to:

command a time-of-flight (TOF) camera having a light transmitter, a light receiver, and a sensor chip, to illuminate one or more targets in a scene proximal to the TOF camera with a modulated signal from the light transmitter, the modulated light signal being scattered off the one or more targets such that a reflected modulated signal is received at the light receiver and processed by the sensor chip to generate a video sequence of the scene comprising a plurality of frames, wherein each of the plurality of frames includes a pixel array representing the scene;

receive for each of the plurality of frames of the video sequence, depth data associated with a respective frame, the depth data comprising a plurality of correlation samples based on the reflected modulated signal associated with the frame;

receive, from the sensor chip, for each respective frame, grayscale image data corresponding to the respective frame;

determine, for each respective frame, a modulation amplitude of the reflected modulated signal based on the plurality of correlation samples;

determine, for each respective frame, one or more parameters associated with at least one of the depth data and the grayscale image data;

determine, for each respective frame, a reliability of the depth data comprising an estimated precision of TOF measurement(s) for each pixel of the pixel array, based on the modulation amplitude of the reflected modulated signal, the grayscale image data, and the one or more parameters associated with at least one of the depth data and the grayscale image data;

generate, for each respective frame, a confidence map comprising mask values for each pixel of the pixel array by comparing the estimated precision for each pixel to a precision threshold; and mask, for each respective frame, one or more pixels of the pixel array based on the mask values.

* * * * *